(12) United States Patent
Paulraj et al.

(10) Patent No.: US 12,615,182 B2
(45) Date of Patent: Apr. 28, 2026

(54) MANAGING USE OF NON-STANDARD FEATURES OF COMPONENTS OF DATA PROCESSING SYSTEMS

(71) Applicant: Dell Products L.P., Round Rock, TX (US)

(72) Inventors: Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,205

(22) Filed: Jul. 26, 2024

(65) Prior Publication Data

US 2026/0032043 A1 Jan. 29, 2026

(51) Int. Cl.
*H04L 41/0806* (2022.01)
*G06F 21/55* (2013.01)

(52) U.S. Cl.
CPC ........ *H04L 41/0806* (2013.01); *G06F 21/554* (2013.01)

(58) Field of Classification Search
None
See application file for complete search history.

(56) References Cited

U.S. PATENT DOCUMENTS 6,976,087 B1 * 12/2005 Westfall ................ H04L 43/087
370/351
7,024,593 B1 * 4/2006 Budd ................... G06F 11/1004
714/48

7,089,335 B2 8/2006 Aiken
7,974,286 B2 7/2011 Keohane et al.
8,826,307 B2 9/2014 Nagampalli
10,075,334 B1 9/2018 Kozura
11,252,192 B1 * 2/2022 Kwan ................... H04L 12/413
2004/0128514 A1 7/2004 Rhoads
2005/0048924 A1 * 3/2005 Nelson .................. H04W 88/18
455/67.11
2005/0078088 A1 4/2005 Davis
2006/0143543 A1 * 6/2006 Mandrell .............. G06F 3/0661
714/43

(Continued)

OTHER PUBLICATIONS

Integrated Dell Remote Access Controller 9 User's Guide. Published Dec. 2021. (Year: 2021).*

(Continued)

*Primary Examiner* — Scott B Christensen
(74) *Attorney, Agent, or Firm* — WOMBLE BOND DICKINSON (US) LLP

(57) ABSTRACT

Methods and systems for managing operation of a data processing system are disclosed. Hardware resources of the data processing system may issue a command for execution by a channel card of the data processing system. The command may be screened based on an interaction model for the channel card. The interaction model may be based on, at least, on a non-standard feature of a type of the channel card. When the interaction model indicates that the command implicates use of the non-standard feature, the command may be modified. The modified command may be used to initiate execution of the non-standard feature by the channel card to facilitate provisioning of a computer-implemented service.

20 Claims, 6 Drawing Sheets

(56) References Cited

U.S. PATENT DOCUMENTS

| | | | |
|---|---|---|---|
| 2006/0285502 A1* | 12/2006 | Bigioi | H04L 67/14 |
| | | | 370/254 |
| 2009/0069049 A1 | 3/2009 | Jain | |
| 2009/0265720 A1 | 10/2009 | Nagampalli | |
| 2012/0257118 A1* | 10/2012 | Aotake | H04N 21/422 |
| | | | 348/725 |
| 2013/0117766 A1 | 5/2013 | Bax | |
| 2013/0283380 A1 | 10/2013 | Thadikaran | |
| 2015/0213355 A1 | 7/2015 | Sharma | |
| 2016/0142243 A1* | 5/2016 | Karam | H04L 41/022 |
| | | | 709/202 |
| 2016/0173578 A1 | 6/2016 | Sharma | |
| 2019/0306018 A1* | 10/2019 | Steverson | H04Q 11/0067 |
| 2019/0342079 A1* | 11/2019 | Rudzitis | G06F 21/602 |
| 2020/0344325 A1* | 10/2020 | Sarisky | H04L 67/1097 |
| 2020/0396128 A1* | 12/2020 | Tseng | G06F 11/0709 |
| 2021/0097186 A1 | 4/2021 | Mandal | |
| 2021/0120104 A1* | 4/2021 | Al-Mufti | H04L 41/0806 |
| 2022/0035685 A1 | 2/2022 | Ghosh | |
| 2022/0091744 A1* | 3/2022 | Kutner | G06F 3/0619 |
| 2022/0100840 A1* | 3/2022 | Shtalenkov | H04L 67/1097 |
| 2022/0121619 A1 | 4/2022 | Sharma | |
| 2022/0151022 A1* | 5/2022 | Chikkur Dattatraya | |
| | | | H04L 69/323 |
| 2022/0207463 A1 | 6/2022 | Young | |
| 2023/0259632 A1 | 8/2023 | Marciano | |
| 2023/0328037 A1 | 10/2023 | Sankaranarayanan | |
| 2024/0267251 A1* | 8/2024 | Mishelevich | G16Y 40/35 |
| 2025/0148078 A1* | 5/2025 | Lal | G10L 13/027 |

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HROT.pdf> accessed on Jul. 23, 2024 (17 Pages).

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

* cited by examiner

MANAGING USE OF NON-STANDARD FEATURES OF COMPONENTS OF DATA PROCESSING SYSTEMS

FIELD

Embodiments disclosed herein relate generally to managing operation of data processing systems. More particularly, embodiments disclosed herein relate to systems and methods to manage use of non-standard features of components of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
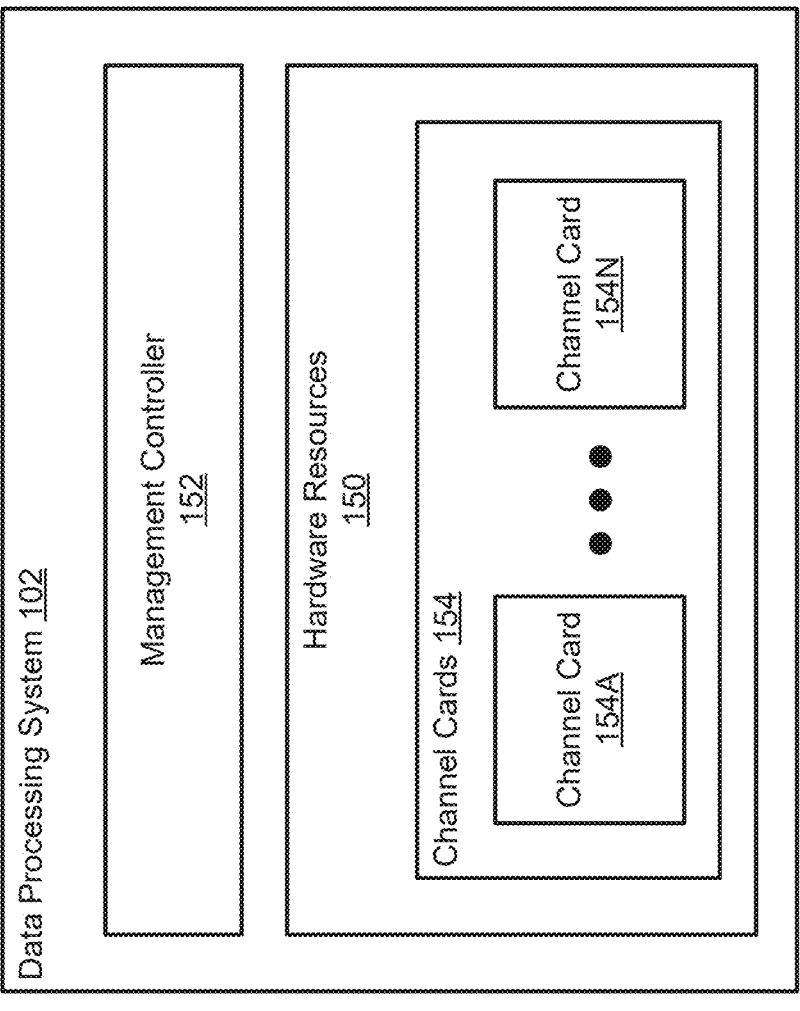
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services. To provide the computer-implemented services, hardware resources of the data processing system such as memory, processors, channel cards, etc., may operate in cooperation with one another. To do so, during manufacturing of the data processing system, the manufacturer may prepare the data processing system with firmware, drivers, and/or configuration settings that support the cooperative operation of the hardware resources included in the data processing system at its time of manufacturing (e.g., stock hardware components).

For example, a processor of the data processing system may interact with a channel card of the data processing system to facilitate provision of the computer-implemented services. The channel card may include, for example, a graphics card, a sound card, a storage card, and/or other types of hardware components of the data processing system that may be added, removed and/or replaced. To interact with the channel card, the processor may issue native commands (e.g., commands designed specifically for the processor that may be recognized by the channel card) that invoke known functionality of the channel card.

Over time (e.g., after an end user obtains the data processing system from the manufacturer), stock hardware components of the data processing system may be modified. For example, portions of the stock hardware components may be replaced, added, removed, and/or otherwise modified to improve performance of the data processing system. However, if a stock hardware component is modified, then any firmware, drivers, and/or configuration settings associated with the modified hardware component may be required to be updated so that the hardware resources may continue to operate cooperatively.

For example, the user may replace a stock channel card of the data processing system with an aftermarket channel card. The aftermarket channel card may include a channel card with different (e.g., additional) functionality from the stock channel card. For example, the aftermarket channel card may include standard features (e.g., known functionality, based on a current or preceding industry standard with which the aftermarket channel card is compliant) and non-standard features. The non-standard features may be additional to those of the industry standard (e.g., functionality not known by the stock hardware components), and therefore may not be natively invokable via commands issued by the stock hardware components and/or software hosted thereon. For example, native commands issued by the stock hardware resources may not include instructions for activating the non-standard functionality.

Thus, to utilize the non-standard features of the aftermarket channel card, operation of the hardware resources may be required to be reconfigured and/or otherwise updated (e.g., via software, firmware, and/or driver updates) by the user and/or via a remote system. However, this may present security risks and opportunities for error, which may lead to disruptions to the computer-implemented services and/or an inability for the data processing system to provide the computer-implemented services.

Thus, to improve the likelihood of providing the computer-implemented services in view of modified hardware components of the data processing system, interactions between aftermarket hardware components and stock hardware components of the data processing system may be managed. To do so, the data processing system may include out-of-band (hardware) components (e.g., a management controller). The out-of-band components may operate independently from in-band components (e.g., the hardware resources) of the data processing system and may implement interaction models to manage interactions between the stock hardware components and the aftermarket hardware components (e.g., aftermarket channel cards) of the data processing system.

The interaction models may provide a mechanism for invoking non-standard features of the channel cards when providing the computer-implemented services. For example, the interaction models may include a schema (e.g., a rule set) that may be used to obtain customized commands (that may be recognized by the channel cards) based on native commands issued by stock hardware components of the data processing system.

By doing so, embodiments disclosed herein may provide a system for managing operation of a data processing system in a manner that increases the likelihood of facilitating desired computer-implemented services and reduces the likelihood of disruptions to the computer-implemented services after modifications to the hardware resources.

Thus, embodiments disclosed herein may address, among others, the technical problem of managing interactions that include aftermarket modified portions of hardware resources of data processing systems. By managing the interactions automatically and locally (e.g., without user intervention, using out-of-band components of the data processing systems), the data processing systems may be more likely to provide the desired computer-implemented services in a secure manner.

In an embodiment, a method for managing operation of a data processing system is provided. The method may include making an identification that hardware resources of the data processing system have issued a command, the command being for execution by a channel card of the data processing system.

Based on the identification, the method may include screening the command based on an interaction model for the channel card, the interaction model being based on, at least, a non-standard feature of the channel card based on standard features of a type of the channel card.

In a first instance of the screening where the interaction model indicates that the command implicates use of the non-standard feature, the method may include: modifying, based on the interaction model, the command to obtain a non-standard feature customized command; and, initiating execution of the non-standard feature customized command by the channel card to facilitate provisioning of a computer-implemented service.

The data processing system may include a management controller separate from and tasked with managing operation of the hardware, the hardware resources including a channel card and a processor that issued the command based on execution of a program thereon. The screening, modifying, and the initiating may be performed, at least in part, by the management controller. To perform the screening, the management controller may monitor the processor to identify and intercept issued commands transparently to the processor.

The interaction model may be based, at least in part, on user input indicating whether the non-standard feature is to be utilized during processing by the channel card. The user input may be based on an interaction between the management controller and a user of the data processing system, the user desiring the computer-implemented service to be provided.

The standard features of the type of the channel card may be based on an industry standard with which the channel card is compliant. The non-standard feature may be a capability of the channel card that is additional to those of the industry standard, and may not be natively invokable by the hardware resources and software hosted thereon.

The method may also include, prior to making the identification and by a management controller of the data processing system: performing a feature identification process for the channel card to identify the non-standard feature; obtaining user input regarding use of the non-standard feature; and, obtaining the interaction model for the channel card based on the user input.

Obtaining the interaction model may include storing a data structure in the management controller that maps commands to modified commands. Obtaining the interaction model may also include programming the channel card to utilize maps of the commands to the modified commands as part of command processing by the channel card.

Obtaining the interaction model may include exporting the data structure to other management controllers of other data processing systems that host similar channel cards to the channel card to facilitate use of similar non-standard features.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using various components of hardware resources of the data processing system, such as channel cards (e.g., graphics cards, network interface cards (NICs), accelerator cards, expansion cards).

To provide the computer-implemented services, hardware components of the system (e.g., a data processing system) may interact with one another cooperatively. For example, the computer-implemented services may require cooperative interaction between processors, memory modules, storage devices, and/or the channel cards. Based on these interactions, the hardware components may support execution of any number and/or types of software components (e.g., applications hosted by the hardware components), and, in some combination, the hardware and software components may provide for various types of computer-implemented services.

The interactions between the hardware and/or software components may depend on the presence of appropriate firmware, drivers, configuration data, and/or configuration settings of the data processing system that support the cooperative interactions. For example, a channel card of the data processing system may require that specialized firmware be installed to the data processing system, and the specialized firmware may define commands that, when issued to the channel card, may activate a feature of the channel card necessary for providing desired computer-implemented services. Thus, during setup (e.g., manufacturing) of the data processing systems, the appropriate firmware, drivers, configuration data, and/or configuration settings that reflect functionality of existing (e.g., stock) hardware components of the data processing system may be installed.

Over time (e.g., after manufacturing or setup), hardware components such as channel cards may be modified (e.g., by an end user). For example, a stock channel card may be replaced with an aftermarket channel card, and/or aftermarket channel cards may be added to the data processing system. Functionality of the aftermarket channel cards may vary to a high degree depending on their vendor (e.g., manufacturer of the channel card) and/or due to the programmable nature of some channel cards (SmartNICs, data processing unit (DPU) cards, etc.).

For example, channel cards may include programmable platform devices capable of performing various functions in various different ways and/or some may require special methods of communication (e.g., specialized application programming interfaces (APIs)). In other words, some functionality or features of the channel cards (i) may not adhere to an industry standard for similar types of channel cards, (ii) may be in addition to the functionality specified by the industry standard, and/or (iii) may otherwise require specialized or unusual information to utilize such functions/features. These functions or features may be referred to as non-standard features. Therefore, the stock hardware components (e.g., hardware components added by the manufacturer during manufacturing and that may only include capabilities to natively interact with industry standard functionalities/features) may be unable to natively invoke the non-standard features of the channel cards without downloading and installing third-party proprietary drivers and/or APIs for the channel cards.

However, the downloading and/or installing of proprietary software may present security risks. For example, obtaining data from external and/or remote sources may include risks of introducing malicious data and/or risks of data leaks. In addition, for example, modifications made to a software stack (e.g., during installation of the proprietary software) of the data processing system may result in errors when performed by an unseasoned user or when performed for a complex network of computers. Consequently, the downloading and/or installing of proprietary software may negatively impact functionality of the hardware resources and, therefore, the computer-implemented services.

In general, embodiments disclosed herein may provide methods, systems, and/or devices for managing operation of data processing system in a manner that facilitates use of non-standard features of aftermarket channel cards. The operation of the data processing system may be managed using interaction models for the (aftermarket) channel cards. The interaction models may be based on the non-standard features of the channel cards and may be used to automatically guide interactions between the (stock) hardware components and the channel cards so that the non-standard features may be utilized without the need for proprietary software. For example, the interaction models may be used to map native commands (e.g., commands issued by the stock hardware components) for the channel cards to customized commands that may invoke the non-standard features. To do so, the data processing system may include out-of-band (hardware) components, such as a management controller. The out-of-band components may be tasked with managing and implementing the interaction models so that non-standard features of the channel cards may be utilized.

To provide the above-mentioned functionality, data processing system 102 may include hardware resources 150 and/or management controller 152. Data processing system 102, any components thereof and/or any other types of devices or components not shown in FIG. 1A may perform all, or a portion of the computer-implemented services independently and/or cooperatively. Each of these components is discussed below.

Hardware resources 150 may include any number of hardware components (e.g., memory, processors, channel cards). For example, hardware resources 150 may include any number of channel cards 154 (e.g., 154A-154N). Channel cards 154 may include expansion cards and/or adapter cards that may add specific functions or features to data processing system 102. Each channel card of channel cards 154 may be designed to perform a specific task and/or provide additional capabilities to data processing system 102 (e.g., beyond what other hardware components such as a motherboard of data processing system 102 may offer). For example, channel cards 154 may include graphics processing units (GPUs), network interface cards (NICs), storage controller cards, wireless network cards, Universal Serial Bus (USB) expansion cards, and/or other types of cards. Channel cards 154 may include any number of stock channel cards (e.g., installed by a manufacturer of data processing system 102) and/or aftermarket channel cards (e.g., added by a user of data processing system 102). Channel cards 154 may function in cooperation with other components of hardware resources 150.

Hardware resources 150 may host applications and/or other software, and store and/or execute instructions provided by the applications and/or the software in order to facilitate provision of a computer-implemented service. For example, based on the instructions, a processor of data processing system 102 may interact with channel card 154A of data processing system 102 by issuing instructions (e.g., commands) to channel card 154A. Upon reading and/or executing the instructions, channel card 154A may perform a desired function in cooperation with the processor and/or other hardware components of hardware resources 150.

To support cooperative interactions between aftermarket (e.g., additional, replacement) channel cards and other hardware components of hardware resources 150, management controller 152 may manage interaction models for the aftermarket channel cards. The interaction models may include schemas (e.g., rule sets) usable to map native commands to non-standard commands and/or any number of data structures indicating mappings between native commands and non-standard commands. For example, as part of managing the interaction models, management controller 152 may (i) identify features (e.g., non-standard features) of aftermarket channel cards installed on data processing system 102, (ii) initiate communication with a user of data processing system 102 in order to obtain user input regarding use of the features, and/or (iii) obtain (e.g., update) interaction models for the channel cards based on the features and/or the user input. A particular interaction model may be obtained, for example, based on a type of non-standard feature desired to be available to the user.

Using the interaction models, management controller 152 may manage command processing for data processing system 102. For example, management controller 152 may (i) screen commands destined to the channel cards to identify whether any desired non-standard features of the channel cards are implicated in the commands, (ii) modify the commands to obtain non-standard feature customized commands, (iii) provide the non-standard feature customized commands to the channel cards, and/or (vi) perform other operations for managing operation of data processing system 102 and/or components thereof. For additional details regarding management of interaction models, refer to the discussion of FIGS. 2A-2B.

Management controller 152 may be distinct from and/or may operate independently from hardware resources 150. To facilitate cooperation between hardware resources 150 and management controller 152, hardware resources 150 may host an agent for management controller 152 (not shown). The agent (e.g., a software program) may facilitate communication between management controller 152 and hardware resources 150. Refer to the discussion of FIG. 1B for more information regarding the functionality of management controller 152.

Figure 2A:
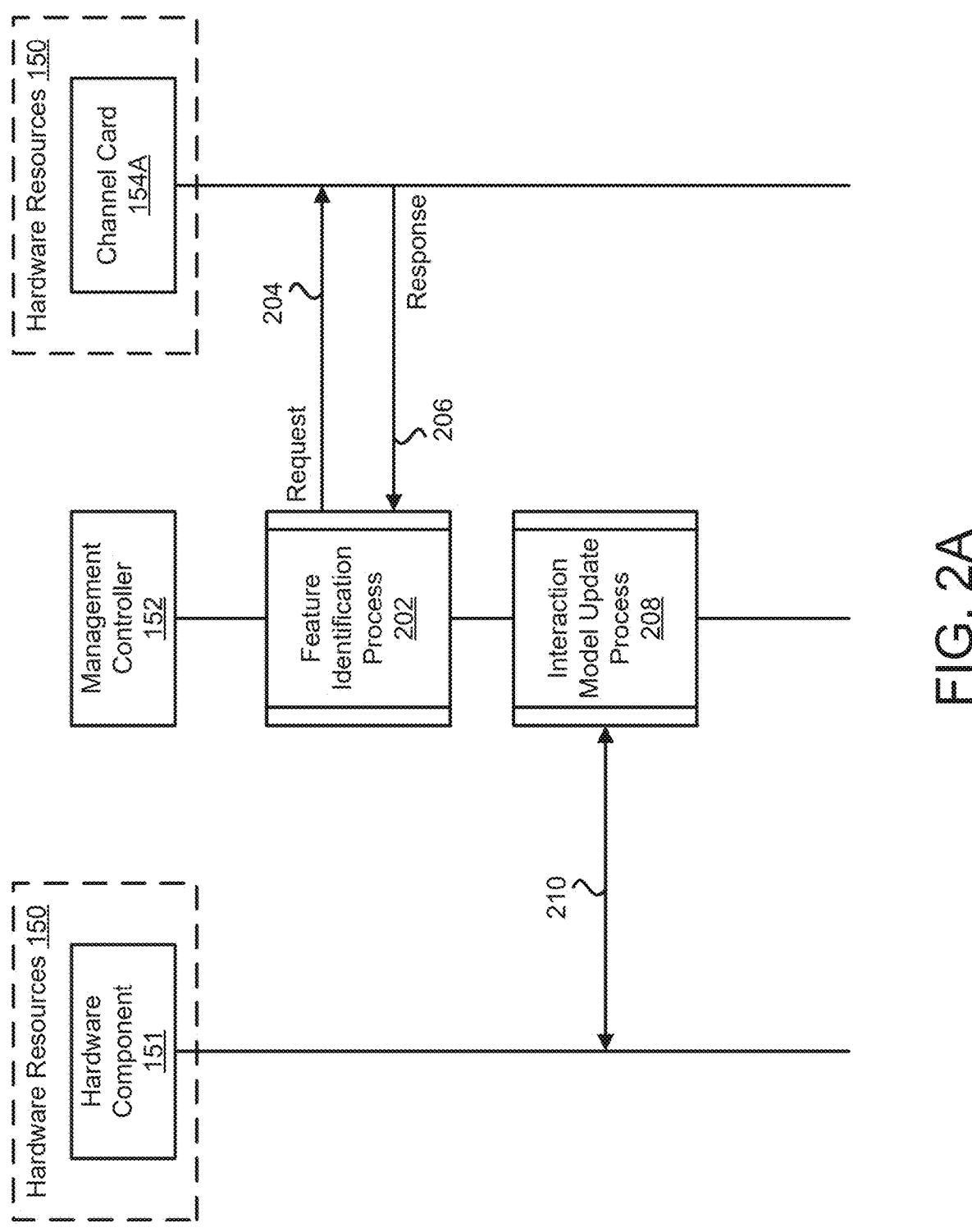
FIGS. 2A-2B show interaction diagrams in accordance with an embodiment.
Figure 2B:
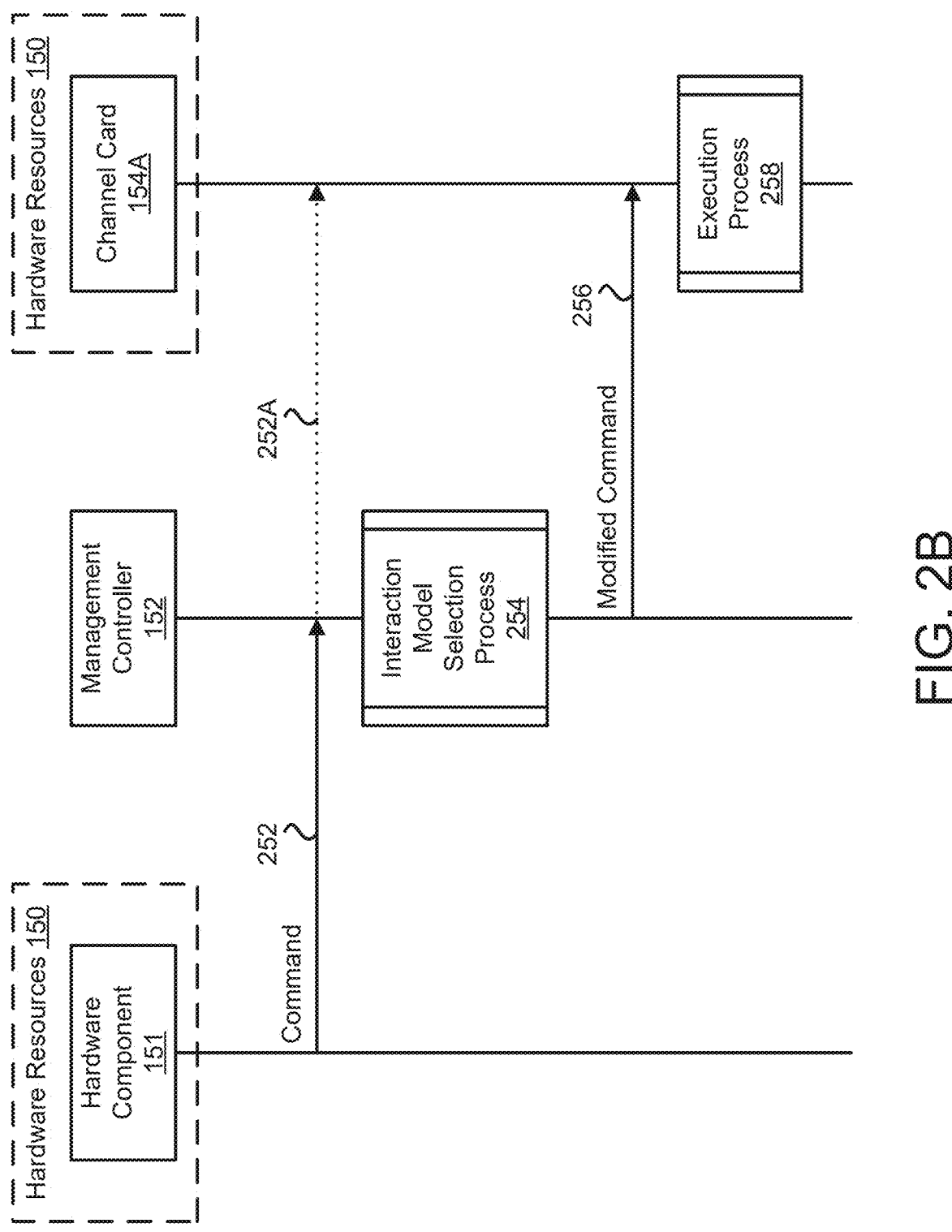
Figure 3:
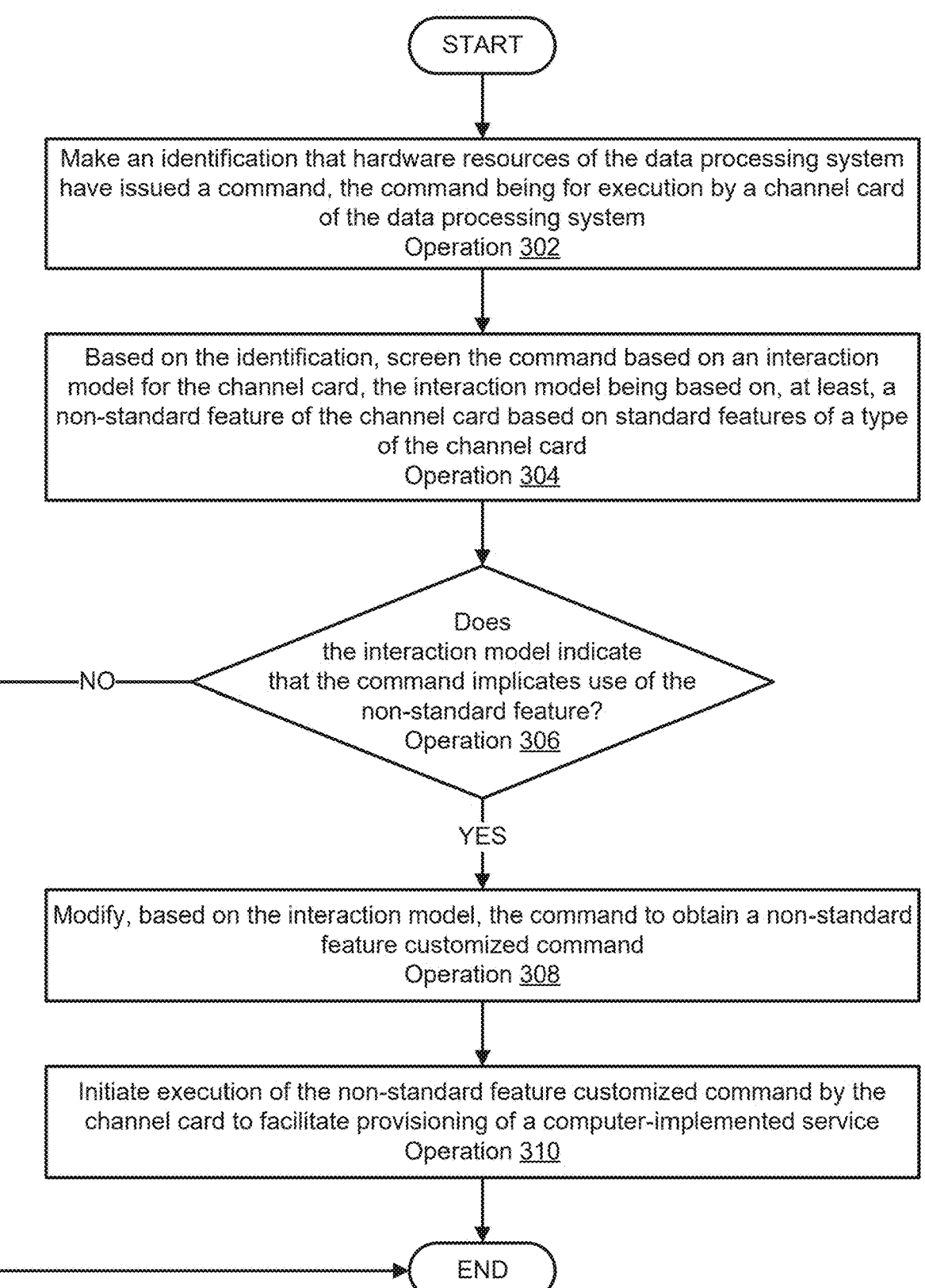
FIG. 3 shows a flow diagram illustrating a method in accordance with an embodiment.

When providing their functionality, any components of data processing system 102 may perform all, or a portion of the actions and methods illustrated in FIGS. 2A-3.

Data processing system 102 (and/or components thereof) may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

While illustrated in FIG. 1A as including a limited number of specific components, a system in accordance with an embodiment may include fewer, additional, and/or different components than those illustrated therein.

Figure 1B:
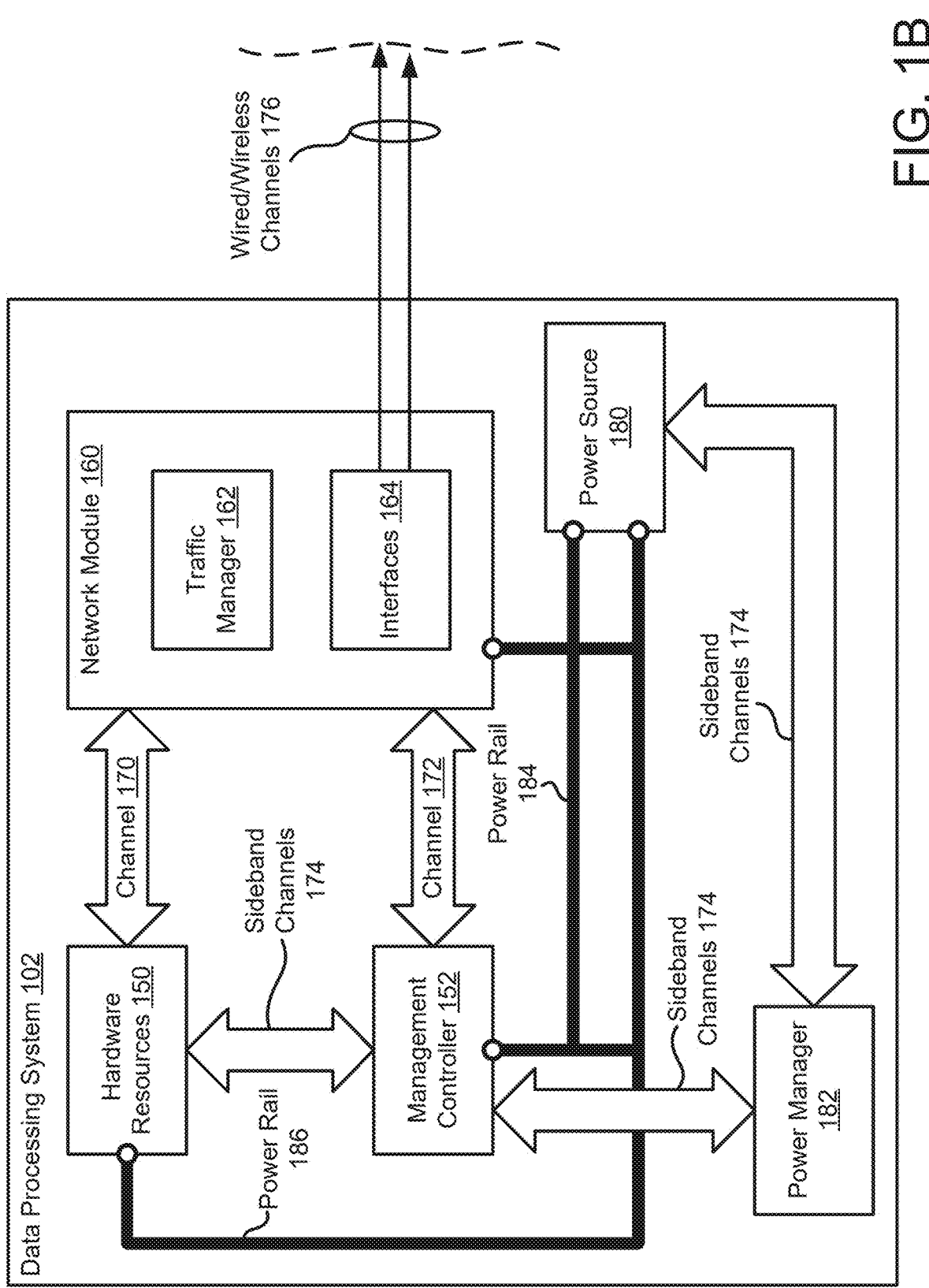
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of the system shown in FIG. 1A.

To provide computer-implemented services, data processing system 102 may include any quantity of hardware resources 150. Hardware resources 150 may be in-band hardware components, and may include a processor operably coupled to memory, storage, channel cards, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150, of a host data processing system 102). Management controller 152 may provide various management functionalities for data processing system 102. For example, management controller 152 may monitor various ongoing processes performed by the in-band components, may manage power distribution, may participate in thermal management, and/or other may perform other functions, such as identifying and/or intercepting commands sent between the in-band components.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 152 and hardware resources 150 so that management controller 152 may identify and/or intercept a command issued by a processor of hardware resources 150 destined for a channel card of hardware resources 150. Management controller 152 may screen and/or modify the command based on an interaction model for the channel card to obtain a customized command. Management controller 152 may use sideband channels 174 to provide the customized command to the channel card (and/or another hardware component of hardware resources 150).

To reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any portion of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components. For example, management controller 152 may obtain (or provide) interaction models from (or to) remote systems via secure out-of-band communication channels (e.g., channel 172) independently from hardware resources 150.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out-of-band components of data processing system 102 may appear to be two independent network entities, that may independently addressable, and otherwise unrelated to one another.

To facilitate management of data processing system 102 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To further clarify embodiments disclosed herein, interaction diagrams in accordance with an embodiment are shown in FIGS. 2A-2B. These interaction diagrams may illustrate how data may be obtained and used within the system of FIGS. 1A-1B. In the examples shown in FIGS. 2A-2B, a data processing system (e.g., 102) may include components such as hardware resources 150 and management controller 152. Hardware resources 150 may include hardware component 151 and channel card 154A. The components of the data processing system may be similar to and/or include functionality similar to those described with respect to FIGS. 1A-1B.

In the interaction diagrams, processes performed by and interactions between components of a system in accordance with an embodiment are shown. In the diagrams, components of the system are illustrated using a first set of shapes (e.g., 151, 152), located towards the top of the figure. Lines descend from these shapes. Processes performed by the components of the system are illustrated using a second set of shapes (e.g., 202, 208, etc.) superimposed over these lines.

Interactions (e.g., communication, data transmissions, etc.) between the components of the system are illustrated using a third set of shapes (e.g., 204, 206) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines drawn in dashing may indicate that the corresponding interactions are optional and/or may not occur during operation of the system for various reasons.

Generally, the processes and interactions are temporally ordered in an example order, with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate flows of data and processing of data that may occur when obtaining an interaction model. To obtain the interaction model, (i) non-standard features of channel card 154A may be identified, and (ii) user input regarding the identified non-standard features may be obtained. The interaction model for channel card 154A may reflect the user input with respect to the non-standard features of channel card 154A. The interaction model may include a schema (e.g., a rule set) usable to modify native commands to obtain non-standard commands. For example, the interaction model may be obtained (e.g., selected, generated) based on the user input so that the modified commands generated by the interaction model invoke non-standard functionality of the aftermarket channel card in a manner that meets the needs of the user.

To identify the non-standard features of channel card 154A, management controller 152 may perform feature identification process 202. Feature identification process 202 may be initiated by management controller 152 based on information obtained during startup of the data processing system. For example, during startup of the data processing system, management controller 152 may identify that a new hardware component is present in the system (e.g., during a secured component verification process and/or via a notification from a startup management entity). The identification of the new hardware component (e.g., channel card 154A) may prompt management controller 152 to perform feature identification process 202.

During feature identification process 202, management controller 152 may request and/or obtain information from channel card 154A. Channel card 154A may include an aftermarket channel card. For example, channel card 154A may be installed to the data processing system after its time of manufacturing and/or after a recent setup of the data processing system; therefore, the data processing system may not include appropriate firmware, drivers, and/or other software necessary to utilize at least a portion of features offered by channel card 154A. To identify features offered by channel card 154A, management controller 152 may provide the request for information to channel card 154A.

At interaction 204, the request may be provided to channel card 154A by management controller 152 by (i) transmission via a message, (ii) storing in a storage with subsequent retrieval by channel card 154A, (iii) a publish-subscribe system where channel card 154A subscribes to updates from management controller 152 thereby causing a copy of the request to be propagated to channel card 154A, and/or (iv) other processes. The request may be provided, for example, via a sideband channel (e.g., of sideband channels 174 of FIG. 1B). By providing the request to channel card 154A, channel card 154A may provide information usable for identifying non-standard features of channel card 154A.

Channel card 154A may include hardware components such as memory, processors, etc., and may include a discovery protocol. For example, the information requested from channel card 154A may include, for example, a request for (i) identifying information of channel card 154A (e.g., a model number, a card type), (ii) features of channel card 154A (e.g., functionalities channel card 154A is capable of performing), (iii) interface elements of channel card 154A, and/or (iv) other information regarding channel card 154A. Channel card 154A may read the request and obtain a response to the request.

For example, if channel card 154A supports discovery by management controller 152, then the response may include a list of features supported by channel card 154A. Otherwise, for example, if channel card 154A does not support discovery by management controller 152, the response may include identifying information for channel card 154A.

At interaction 206, the response may be provided to management controller 152 by channel card 154A (e.g., via a sideband channel) by (i) transmission via a message, (ii) storing in a storage with subsequent retrieval by management controller 152, (iii) a publish-subscribe system where management controller 152 subscribes to updates from channel card 154A thereby causing a copy of the response to be propagated to management controller 152, and/or (iv) other processes. Upon obtaining the response, management controller 152 may continue performance of feature identification process 202.

Management controller 152 may read the response to identify non-standard features for channel card 154A. To do so, management controller 152 may identify a type of channel card 154A and/or a list of features of channel card 154A. This information may be included in the response, and/or may be obtained from a remote system or device (e.g., a manufacturer's system) based on other identifying information for channel card 154A included in the response. For example, management controller 152 may use out-of-band communication channels to communicate with the remote system or device to obtain a card type and/or a list of features of channel card 154A.

During feature identification process 202, management controller 152 may use the list of features and the card type to identify the non-standard features of channel card 154A. For example, management controller 152 may compare the list of features with a list of industry standard features for the card type. The non-standard features may include capabilities of channel card 154A that are additional to those of the industry standard (e.g., that are not found on the list of industry standard features for the card type). The non-standard features may not be natively invokable by any of hardware resources 150 (e.g., hardware component 151).

For example, hardware component 151 may include a processor, and channel card 154A may include a performance sound card. Prior to a user installing the performance sound card to the data processing system, the data processing system may have been configured to use an integrated sound card for audio transmission. The integrated sound card may include standard features such as generating and recording audio; therefore, the processor may be configured to issue commands for generating and/or recording audio. However, the performance sound card may include non-standard features in addition to the standard features, such as data caching and/or data processing, and the processor may not be configured to issue such commands.

To provide functionality for invoking non-standard features of channel card 154A, interaction model update process 208 may be performed. During interaction model update process 208, user input regarding the non-standard features may be obtained. To do so, management controller 152 may communicate with a portion of hardware resources 150, such as hardware component 151. Hardware component 151 may include a processor and may receive instructions regarding obtaining the user input from management controller 152. The instructions may be provided to hardware component 151 by management controller 152 at interaction 210 using methods similar to those described with respect to interaction 206 and/or by other methods.

For example, management controller 152 may use a sideband channel to instruct its host system (e.g., hardware resources 150) to generate a pop-up interface (e.g., graphical user interface ((GUI)) through which the user may provide user input. The GUI may display, for example, the non-standard features (e.g., and/or standard features) of channel card 154A, and the user may be prompted to make a selection regarding use of the non-standard features (e.g., and/or standard features). The user may select a portion of the non-standard and/or standard features of channel card 154A. The user's selection, along with other information (e.g., identifying information for the user and/or other meta-data), may be included in a data package (e.g., the user input), and the data package may be provided to (or collected by) management controller 152 from hardware component 151 at interaction 210 using methods similar to those described with respect to interaction 204 and/or by other methods.

During interaction model update process 208, management controller 152 may also provide information regarding the user's selection to the host system (e.g., via hardware component 151). The information may indicate to the host system that management controller 152 may potentially modify (e.g., customize) commands issued to channel card 154A with respect to the user selected non-standard features. The host system may use the information to flag potential security issues with respect to modifying such commands and/or for other purposes.

Management controller 152 may obtain (e.g., generate, populate, update) the interaction model for channel card 154A based on the user input regarding use of the non-standard features. To do so, management controller 152 may store a data structure (e.g., in local memory) that maps commands to modified commands. For example, the command may include a native command issued by hardware component 151 (e.g., a processor of the host system), and the modified command may include a command that, when executed by channel card 154A, invokes a user selected non-standard feature of channel card 154A. Thus, the modified command may include a non-standard feature customized command.

Returning to the performance sound card example, the user may desire to use the data caching and the data processing features of the performance sound card. The interaction model for the performance sound card may map a (native) command that instructs the performance sound card to emit a sound (based on an audio file) from a speaker to a modified (e.g., non-standard feature customized) command that instructs the performance sound card to cache and process the audio file before emitting a sound (based on the processed audio file) from the speaker. The interaction model may map native commands to modified commands based on a set of predetermined criteria, which may include user-specified criteria. For example, the performance sound card may only be instructed to cache and/or process audio files based on characteristics of the audio file (e.g., file size, file type) and/or based on data processing system activity (e.g., usage levels of any of hardware resources 150).

In some examples, during interaction model update process 208, management controller 152 may program channel card 154A to utilize mappings defined by the interaction model. In other words, management controller 152 may modify how channel card 154A performs command processing, so that native commands issued to channel card 154A from hardware components 151 do not require interception and/or modification by management controller 152. Instead, the modification of the native command may be performed locally by channel card 154A.

During interaction model update process 208, management controller 152 may document updates made to the interaction model. For example, the interaction model (e.g., the data structure that defines mappings between commands) may be included in a data package (along with other information) and the data package may be exported to other systems, such as a management system tasked with managing interaction models for a deployment. For example, while not shown in FIG. 2A, management controller 152 may provide the data package via an out-of-band communication channel to the management system that may distribute the data package (e.g., the interaction model) to data processing systems of the deployment that host channel cards similar to channel card 154A. Therefore, in some examples, management controller 152 may receive interaction models (e.g., the interaction model for channel card 154A) from a remote management system and/or from management controllers of other data processing systems.

Thus, the processes and interactions shown in FIG. 2A may be used to obtain interaction models for hardware components (e.g., aftermarket channel cards) of a data processing system. The interaction models may provide for an interface for invoking non-standard features of the hardware components independently from hardware resources 150.

Turning to FIG. 2B, a second interaction diagram in accordance with an embodiment is shown. The second interaction diagram may illustrate flows of data and processing of data that may occur when invoking non-standard features of (aftermarket) hardware components of the data processing system.

To determine whether non-standard features of channel card 154A should be invoked, management controller 152 may obtain (e.g., intercept) a command issued to channel card 154A from hardware component 151 of hardware resources 150 of the data processing system. For example, hardware component 151 may include a processor attempting to invoke a feature of channel card 154A via the command.

At interaction 252, the command may be provided to channel card 154A by hardware component 151 by transmission via a message and/or by other methods. However, management controller 152 may monitor activity of hardware resources 150 (e.g., hardware component 151) and may include functionality for identifying and/or intercepting commands issued to channel card 154A and/or other hardware components of hardware resources 150. For example, management controller 152 may identify and/or intercept the commands transparently (e.g., surreptitiously) to the processor and/or other hardware components of hardware resources 150. Obtaining (e.g., intercepting) the command by management controller 152 may include preventing channel card 154A from receiving the command for at least a period of time, as indicated by the dashed arrow of interaction 252A.

The command issued to channel card 154A by hardware component 151 may include a native command (e.g., that includes instructions for invoking standard features of channel card 154A), but may not include instructions for invoking non-standard features of channel card 154A. To determine whether non-standard features of channel card 154A should be invoked, management controller 152 may perform interaction model selection process 254.

During interaction model selection process 254, management controller 152 may identify an interaction model associated with channel card 154A. For example, management controller 152 may identify the interaction model for channel card 154A obtained via processes and interactions described with respect to FIG. 2A. Management controller 152 may use the interaction model for channel card 154A to screen the command to determine whether the command implicates use of non-standard features of channel card 154A.

If the command does not implicate use of any non-standard features of channel card 154A, then management controller 152 may make the (native) command available to channel card 154A. For example, management controller 152 may provide the command to channel card 154A using methods similar to those described with respect to interaction 204 of FIG. 2A and/or by other methods (not shown).

If the command implicates use of a non-standard feature of channel card 154A, then management controller 152 may use the interaction model to guide modification of the command to obtain a non-standard feature customized command. For example, management controller 152 may append instructions that invoke the non-standard features defined by the interaction model to existing instructions of the command to obtain the non-standard feature customized command.

At interaction 256, the modified command (e.g., the non-standard feature customized command) may be provided to channel card 154A by management controller 152 using methods similar to those described with respect to interaction 204 of FIG. 2A and/or by other methods. The modified command may be provided to channel card 154A for execution.

Upon obtaining the modified command, channel card 154A may perform execution process 258. During execution process 258, channel card 154A may execute instructions included in the modified command and/or other instructions (e.g., stored locally) to participate in provision of a computer-implemented service. By doing so, a non-standard feature of channel card 154A may be utilized to provide user desired computer-implemented services without re-configuring operation of hardware resources 150.

While described as having management controller 152 intercept the command issued from hardware component 151, management controller 152 may instead have configured (e.g., pre-programmed) channel card 154A to perform command modifications in accordance with the interaction model prior to issuance of the command. In this case, when commands are issued by hardware resources 150, management controller 152 may not be required to intercept and/or modify the commands since channel card 154A may already include instructions for performing any necessary command modifications, as well as for executing the modified command rather than the command itself.

Thus, the processes and interactions shown in FIG. 2B, interaction models may be used by a management controller of a data processing system to invoke non-standard features of hardware components of its host system without a need to reconfigure the host system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 3, a flow diagram illustrating a method in accordance with an embodiment is shown. The flow diagram may illustrate various operations performed while managing operation of a data processing system. The data processing system may include hardware resources and a management controller, and may be similar to the data processing system discussed with respect to FIGS. 1A-1B.

At operation 302, an identification that hardware resources of the data processing system have issued a command may be made. The identification may be made by (i) monitoring activity of the hardware resources, (ii) obtaining a notification (e.g., from the hardware resources) indicating that the command has been issued, and/or (iii) via other methods. The management controller of the data processing system may be separate from the hardware resources (e.g., may operate independently of the hardware resources) and may be tasked with managing operation of the hardware resources (e.g., including the channel card).

For example, the hardware resources may include a processor, and the processor may have issued the command based on execution of a program thereon. To identify issuance of the command, the management controller may monitor activity of the processor and may identify a portion of the activity that indicates that the command has been issued. Information included in the command (e.g., a data package of instructions) may indicate that the command may be for execution by a channel card of the data processing system.

Prior to operation 302, an interaction model for the channel card may be obtained. Obtaining the interaction model may include (i) performing a feature identification process for the channel card to identify a non-standard feature of the channel card, (ii) obtaining user input regarding use of the non-standard feature, and (iii) obtaining the interaction model based on the user input.

The feature identification process may be performed by a management controller and/or using methods similar to those discussed with respect to feature identification process 202 of FIG. 2A. For example, performing the feature identification process may include comparing a list of features of the channel card to a list of industry standard features for the type of the channel card.

Obtaining the user input regarding use of the non-standard feature may include (i) obtaining a list of non-standard features of the channel card, and (ii) prompting the user to provide the user input based on the list of non-standard features. The user input may be based on an interaction between the management controller and a user of the data processing system, the user desiring the computer-implemented service to be provided. For example, the management controller may provide instructions to the hardware resources that, once executed, initiate a pop-up GUI that displays the list of non-standard features of the channel card and that indicates that user input regarding use of the non-standard feature is requested. The interaction model may be based, at least in part, on the user input indicating whether the non-standard feature is to be utilized during processing by the channel card.

Obtaining the interaction model may include storing a data structure in the management controller that maps commands to modified commands. For example, the data structure may be stored in local memory of the management controller. Storing the data structure may include obtaining the data structure and instructions for performing a storage process and/or performing the storage process.

The interaction model may be based on, at least, a non-standard feature of the channel card. For example, standard features of the channel card may be based on an industry standard with which the channel card is compliant. The non-standard feature may be distinct from the standard features defined by the industry standard. For example, the non-standard feature may be a capability of the channel card that is additional to those of the industry standard and that is not natively invokable by the hardware resources (e.g., the processor) and software hosted thereon. Thus, if the user input indicates that the non-standard feature is to be utilized, then the interaction model may specify a mapping for the command issued by the processor to a modified command that invokes the non-standard feature of the channel card.

Obtaining the interaction model may also include programming the channel card to utilize maps of the commands to the modified commands as part of command processing by the channel card. The channel card may be programmed by updating instructions stored in local memory of the channel card. For example, the management controller may provide instructions to the channel card for local storage and access, and the channel card may execute the instructions during command processing.

Obtaining the interaction model may also include exporting the data structure to other management controllers of other data processing systems that host similar channel cards to the channel card to facilitate use of similar non-standard features. The data structure (e.g., the interaction model) may be exported to other systems by, for example, transmitting the data structure to the other data processing systems via a communication channel (e.g., out-of-band communication channels established between the management controller and the other management controllers of the other systems). For more details regarding obtaining interaction models, refer to interaction model update process 208 of FIG. 2A.

At operation 304, based on the identification, the command may be screened based on an interaction model for the channel card. The command may be screened, at least in part, by the management controller. For example, the command may be screened by (i) identifying the interaction model for the channel card (e.g., from a repository of interaction models for various hardware components of the data processing system), and (ii) comparing the command issued by the processor to mappings specified by the interaction model to identify whether a mapping exists for the command issued by the processor.

To perform the screening, the management controller may monitor activity of the hardware resources (e.g., the processor) to identify and intercept issued commands transparently to the processor. For example, the management controller may perform the screening process independently and surreptitiously (e.g., without notifying the processor).

At operation 306, a determination may be made regarding whether the interaction model indicates that the command implicates use of the non-standard feature. The determination may be made based on a result of the screening. For example, if the interaction model specifies a mapping for the command issued by the processor (e.g., if the mapping exists), then the command may implicate use of the non-standard feature. Otherwise, the command may not implicate use of the non-standard feature.

If the interaction model does not indicate that the command implicates use of the non-standard feature, then the method end following operation 306. Otherwise, the method may proceed to operation 308 following operation 306.

At operation 308, the command may be modified based on the interaction model to obtain a non-standard feature customized command. The command may be modified, at least in part, by the management controller. The command may be modified by (i) appending instructions to the command (e.g., the appended instructions being specified by a mapping of the interaction model), (ii) replacing at least a portion of the command with a modified command specified by the interaction model, and/or (iii) other methods. The non-standard feature customized command may include instructions that invoke the non-standard feature of the channel card and/or standard features of the channel card.

At operation 310, execution of the non-standard feature customized command by the channel card may be initiated to facilitate provisioning of a computer-implemented service. The execution of the non-standard feature may be initiated by providing the non-standard feature customized command to the channel card using methods similar to those described with respect to interaction 256 of FIG. 2B and/or by other methods. The execution of the non-standard feature customized command may be initiated, at least in part, by the management controller.

The computer-implemented service may be facilitated and/or provided, in part, upon execution of at least a portion of the instructions included in the non-standard feature customized command by the channel card. For example, the channel card may execute the instructions included in the non-standard feature customized command in cooperation with execution of other instructions by other hardware resources of the data processing system to provide the computer-implemented service.

The method may end following operation 310.

Thus, as illustrated above, embodiments disclosed herein may provide systems and methods usable to manage operation of a data processing system using interaction models that facilitate use of non-standard features of hardware components of the data processing system. The interaction models may be managed and implemented independently from the hardware components by a management controller of the data processing system. By doing so, the non-standard features may be supported by the data processing system without a need for reconfiguration of the data processing system.

Thus, embodiments disclosed herein may provide an improved computing device that is able to invoke non-standard features of hardware components in a manner that reduces the likelihood of interruptions to the computer-implement services, and that reduces risk associated with reconfiguration and/or installation of proprietary software. Accordingly, the disclosed process provides for both an embodiment in computing technology and an improved method for managing operation of the data processing system.

Figure 4:
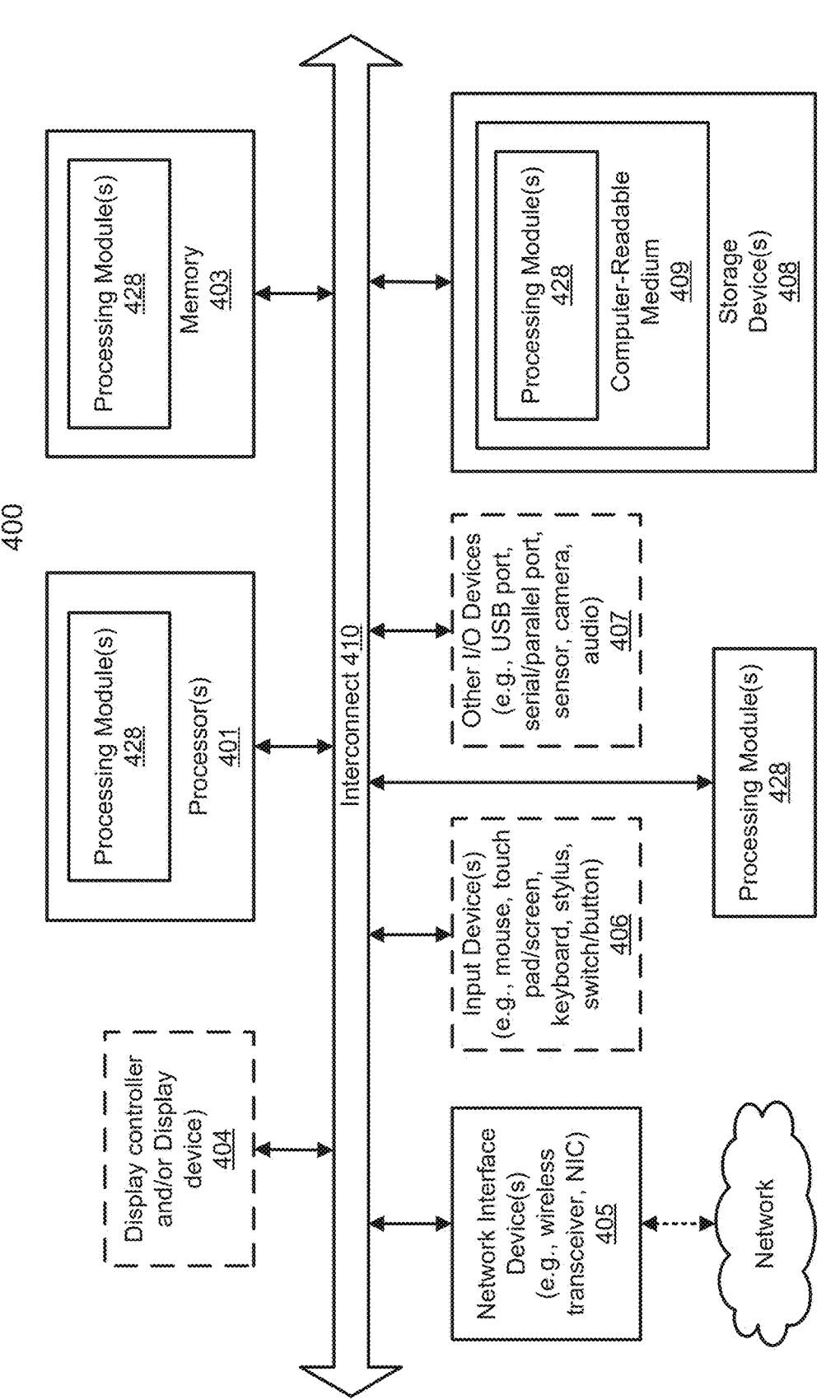
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

making an identification, by a management controller physically installed within the data processing system, that a processor of the data processing system has issued a command for execution by a channel card of the data processing system; and based on the identification:

screening the command based on an interaction model for the channel card, the interaction model being based on, at least, a non-standard feature of the channel card based on standard features of a type of the channel card, wherein the standard features of the type of the channel card are based on an industry standard with which the channel card is compliant and the non-standard feature is a capability of the channel card that is additional to those of the industry standard, and is not natively invokable by hardware resources of the data processing system and software hosted thereon, and in a first instance of the screening where the interaction model indicates that the command implicates use of the non-standard feature:

preventing the channel card from receiving the command for at least a period of time;

modifying, based on the interaction model, the command to obtain a non-standard feature customized command; and initiating execution of the non-standard feature customized command by the channel card to facilitate provisioning of a computer-implemented service, and in a second instance of the screening where the interaction model indicates that the command implicates use of the standard features, allowing the channel card to receive the command without modification.

2. The method of claim 1, wherein the management controller is separate from and tasked with managing operation of the hardware resources of the data processing system, the hardware resources comprising:

the channel card; and the processor that issued the command based on execution of a program thereon.

3. The method of claim 1, wherein each of the screening, the modifying, and the initiating are performed, at least in part, by the management controller.

4. The method of claim 1, wherein to perform the screening, the management controller monitors the processor to identify and intercept issued commands transparently to the processor.

5. The method of claim 1, wherein the interaction model is based, at least in part, on user input indicating whether the non-standard feature is to be utilized during processing by the channel card.

6. The method of claim 5, wherein the user input is based on an interaction between the management controller and a user of the data processing system, the user desiring the computer-implemented service to be provided.

7. The method of claim 1, further comprising:

prior to making the identification and by a management controller of the data processing system:

performing a feature identification process for the channel card to identify the non-standard feature;

obtaining user input regarding use of the non-standard feature; and obtaining the interaction model for the channel card based on the user input.

8. The method of claim 7, wherein obtaining the interaction model comprises:

storing a data structure in the management controller that maps commands to modified commands.

9. The method of claim 8, wherein obtaining the interaction model further comprises:

programming the channel card to utilize maps of the commands to the modified commands as part of command processing by the channel card.

10. The method of claim 8, wherein obtaining the interaction model further comprises:

exporting the data structure to other management controllers of other data processing systems that host similar channel cards to the channel card to facilitate use of similar non-standard features.

11. The method of claim 1, wherein the data processing system has a single network module that separately advertises network endpoints for the management controller and the hardware resources of the data processing system such that first communications meant for the hardware resources never flow through the management controller and second communications meant for the management controller never flow through the hardware resources.

12. The method of claim 11, wherein the management controller and the single network module are on separate power domains from the hardware resources so that the management controller and the single network module are operable while the hardware resources are inoperable.

13. A non-transitory machine-readable medium having instructions stored therein, which when executed by a management controller of a data processing system, cause the management controller to perform operations for managing operation of the data processing system, the operations comprising:

making an identification, by the management controller that is physically installed within the data processing system, that a processor of the data processing system has issued a command for execution by a channel card of the data processing system; and based on the identification:

screening the command based on an interaction model for the channel card, the interaction model being based on, at least, a non-standard feature of the channel card based on standard features of a type of the channel card, wherein the standard features of the type of the channel card are based on an industry standard with which the channel card is compliant and the non-standard feature is a capability of the channel card that is additional to those of the industry standard, and is not natively invokable by hardware resources of the data processing system and software hosted thereon, and in a first instance of the screening where the interaction model indicates that the command implicates use of the non-standard feature:

preventing the channel card from receiving the command for at least a period of time;

modifying, based on the interaction model, the command to obtain a non-standard feature customized command; and initiating execution of the non-standard feature customized command by the channel card to facilitate provisioning of a computer-implemented service, and in a second instance of the screening where the interaction model indicates that the command implicates use of the standard features, allowing the channel card to receive the command without modification.

14. The non-transitory machine-readable medium of claim 13, wherein the management controller is separate from and tasked with managing operation of the hardware resources of the data processing system, the hardware resources comprising:

the channel card; and the processor that issued the command based on execution of a program thereon.

15. The non-transitory machine-readable medium of claim 13, wherein each of the screening, the modifying, and the initiating are performed, at least in part, by the management controller.

16. The non-transitory machine-readable medium of claim 13, wherein to perform the screening, the management controller monitors the processor to identify and intercept issued commands transparently to the processor.

17. A data processing system, comprising:

a management controller physically installed within the data processing system; and a memory coupled to the management controller to store instructions, which when executed by the management controller, cause the management controller to perform operations, the operations comprising:

making an identification, by the management controller, that a processor of the data processing system has issued a command for execution by a channel card of the data processing system, and based on the identification:

screening the command based on an interaction model for the channel card, the interaction model being based on, at least, a non-standard feature of the channel card based on standard features of a type of the channel card, wherein the standard features of the type of the channel card are based on an industry standard with which the channel card is compliant and the non-standard feature is a capability of the channel card that is additional to those of the industry standard, and is not natively invokable by hardware resources of the data processing system and software hosted thereon; and in a first instance of the screening where the interaction model indicates that the command implicates use of the non-standard feature:

preventing the channel card from receiving the command for at least a period of time, modifying, based on the interaction model, the command to obtain a non-standard feature customized command, and initiating execution of the non-standard feature customized command by the channel card to facilitate provisioning of a computer-implemented service; and in a second instance of the screening where the interaction model indicates that the command implicates use of the standard features, allowing the channel card to receive the command without modification.

18. The data processing system of claim 17, wherein the management controller is separate from and tasked with managing operation of the hardware resources of the data processing system, the hardware resources comprising:

the channel card; and the processor that issued the command based on execution of a program thereon.

19. The data processing system of claim 17, wherein each of the screening, the modifying, and the initiating are performed, at least in part, by the management controller.

20. The data processing system of claim 17, wherein to perform the screening, the management controller monitors the processor to identify and intercept issued commands transparently to the processor.

* * * * *